United States Patent
Lin et al.

(10) Patent No.: US 9,606,659 B2
(45) Date of Patent: Mar. 28, 2017

(54) TOUCH DISPLAY PANEL, TOUCH DISPLAY DEVICE AND DISPLAY DEVICE

(71) Applicant: InnoLux Corporation, Miao-Li County (TW)

(72) Inventors: Chia-Lung Lin, Miao-Li County (TW); Tzu-Ti Hung, Miao-Li County (TW); Yi-Hung Ho, Miao-Li County (TW)

(73) Assignee: INNOLUX CORPORATION, Jhu-Nan, Miao-Li County (TW)

( * ) Notice: Subject to any disclaimer, the term of this patent is extended or adjusted under 35 U.S.C. 154(b) by 168 days.

(21) Appl. No.: 14/497,040

(22) Filed: Sep. 25, 2014

(65) Prior Publication Data
US 2015/0103053 A1  Apr. 16, 2015

(30) Foreign Application Priority Data
Oct. 11, 2013 (TW) .............................. 102136854 A (51) Int. Cl.
*G06F 3/041* (2006.01)

(52) U.S. Cl.
CPC .. *G06F 3/0412* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2007/0108032 A1* | 5/2007 | Matsumoto | ............. | G06F 3/045 200/512 |
| 2009/0066862 A1* | 3/2009 | Ishii | .................. | G02F 1/133308 349/12 |
| 2009/0086114 A1* | 4/2009 | Higuchi | .............. | G02F 1/13338 349/12 |
| 2009/0231500 A1* | 9/2009 | Ha | ..................... | G02F 1/133504 349/12 |
| 2010/0090975 A1* | 4/2010 | Nagata | .................... | G06F 3/044 345/174 |
| 2010/0110326 A1* | 5/2010 | Isobe | .................... | G02F 1/1323 349/58 |
| 2010/0164885 A1* | 7/2010 | Hosorogi | .............. | G06F 3/0412 345/173 |

(Continued)

FOREIGN PATENT DOCUMENTS

| | | |
|---|---|---|
| CN | 102005162 A | 4/2011 |
| CN | 102981305 A | 3/2013 |

(Continued)

*Primary Examiner* — Kumar Patel
*Assistant Examiner* — Amy C Onyekaba
(74) *Attorney, Agent, or Firm* — Muncy, Geissler, Olds & Lowe, P.C.

(57) ABSTRACT

A touch display panel includes a display panel, a touch panel, an optical film and an adhesive layer. The display panel includes a first substrate and a second substrate. The first substrate and the second substrate are disposed oppositely along a first direction. The touch panel is disposed over the display panel along the first direction. The optical film is disposed between the second substrate and the touch panel along the first direction. The adhesive layer is disposed on the outside of the optical film and adheres to the second substrate and the touch panel. A touch display device and a display device are also disclosed.

19 Claims, 6 Drawing Sheets

(56) References Cited

U.S. PATENT DOCUMENTS

| | | | | |
|---|---|---|---|---|
| 2010/0245706 A1* | 9/2010 | Oohira | ............. | G02F 1/133308 349/58 |
| 2010/0296027 A1* | 11/2010 | Matsuhira | ......... | G02F 1/133308 349/96 |
| 2013/0284350 A1* | 10/2013 | Ishii | .................. | B29D 11/0073 156/146 |
| 2014/0063369 A1* | 3/2014 | Hosorogiya | ........ | G02F 1/13338 349/12 |

FOREIGN PATENT DOCUMENTS

| | | |
|---|---|---|
| TW | M399376 U | 3/2011 |
| TW | 201142408 A | 12/2011 |
| TW | 201209656 A | 3/2012 |
| TW | 201227474 A | 7/2012 |
| TW | M451596 U | 4/2013 |

\* cited by examiner

TOUCH DISPLAY PANEL, TOUCH DISPLAY DEVICE AND DISPLAY DEVICE

CROSS REFERENCE TO RELATED APPLICATIONS

This Non-provisional application claims priority under 35 U.S.C. §119(a) on Patent Application No(s). 102136854 filed in Taiwan, Republic of China on Oct. 11, 2013, the entire contents of which are hereby incorporated by reference.

BACKGROUND OF THE INVENTION

Field of Invention

The invention relates to a touch display panel, a touch display device and a display device and, in particular, to a touch display panel, a touch display device and a display device with features of lightness, thinness and strong mechanical strength.

Related Art

With the progress of technologies, various novel information devices, such as cell phones, tablet computers, ultrabooks and GPS navigation devices, are continuously invented. Generally, a keyboard and mouse are commonly used to manipulate the information device for inputting information. Nevertheless, the touch control technology currently also becomes a popular manipulation method for the information device and brings an intuitive operation.

The touch function has been added into the display device for a long time in the industry, and besides, the glass substrate applied to the display panel or touch panel is thinner and thinner. Therefore, it is an important subject to provide a touch display panel, a touch display device and a display device featured by lightness, thinness and strong mechanical strength under the control of limited cost.

SUMMARY OF THE INVENTION

In view of the foregoing subject, an objective of the invention is to provide a touch display panel, a touch display device and a display device which are featured by lightness, thinness and strong mechanical strength.

To achieve the above objective, a touch display panel according to the invention includes a display panel, a touch panel, an optical film and an adhesive layer. The display panel includes a first substrate and a second substrate. The first substrate and the second substrate are disposed oppositely along a first direction. The touch panel is disposed over the display panel along the first direction. The optical film is disposed between the second substrate and the touch panel along the first direction. The adhesive layer is disposed on the outside of the optical film and adheres to the second substrate and the touch panel.

In one embodiment, the optical film is a polarizer.

In one embodiment, the interval between the optical film and the touch panel along the first direction is greater than or equal to 0 mm and less than or equal to 0.3 mm.

In one embodiment, the thickness of the optical film along the first direction is greater than or equal to 0.1 mm and less than or equal to 0.2 mm.

In one embodiment, the thickness of the adhesive layer along the first direction is 1~1.5 times the thickness of the optical film.

In one embodiment, an outer edge of the adhesive layer and an outer edge of the second substrate are on the same plane along the first direction.

In one embodiment, the width of the adhesive layer along a second direction perpendicular to the first direction is greater than or equal to 0.7 mm and less than or equal to 0.9 mm.

In one embodiment, the adhesion of the adhesive layer is between 5N/cm~20N/cm.

In one embodiment, the interval between an outer edge of the optical film and an inner edge of the adhesive layer along the second direction is greater than or equal to 0 mm and less than or equal to 0.1 mm.

In one embodiment, the interval between an outer edge of the touch panel and an outer edge of the first substrate along the second direction is greater than or equal to 1 mm and less than or equal to 3 mm.

In one embodiment, the interval between an outer edge of the touch panel and an outer edge of the second substrate along the second direction is greater than or equal to 1 mm and less than or equal to 3 mm.

In one embodiment, the interval between an outer edge of the touch panel and an outer edge of the optical film along the second direction is greater than or equal to 2 mm and less than or equal to 5 mm.

In one embodiment, an outer edge of the adhesive layer protrudes from the second substrate and the protruding portion thereof has a curved shape.

In one embodiment, the adhesive layer includes a plurality of adhesive elements, the end of each of the adhesive elements has a protrusion and an indentation, and the protrusion of one of the adhesive elements is complementary to the indentation of the adjacent adhesive element.

In one embodiment, each of the adhesive elements is a black double-sided adhesive.

In one embodiment, the touch panel includes a substrate which is a cover plate.

To achieve the above objective, a touch display device according to the invention comprises a touch display panel and a backlight module. The touch display panel includes a display panel, a touch panel, an optical film and an optical film. The display panel includes a first substrate and a second substrate disposed opposite to the first substrate along a first direction. The touch panel is disposed over the display panel along the first direction. The optical film is disposed between the second substrate and the touch panel along the first direction. The adhesive layer is disposed on the outside of the optical film and adheres to the second substrate and the touch panel. The backlight module is disposed on the side of the display panel away from the touch panel along the first direction.

In one embodiment, the touch display device further comprises a control circuit board electrically connected to the display panel and the touch panel.

To achieve the above objective, a display device according to the invention comprises a display panel, a cover plate, an optical film and an adhesive layer. The display panel includes a first substrate and a second substrate disposed opposite to the first substrate along a first direction. The cover plate is disposed over the display panel along the first direction. The optical film is disposed between the second substrate and the cover plate along the first direction. The adhesive layer is disposed on the outside of the optical film and adheres to the second substrate and the cover plate.

In one embodiment, the display device further comprises a touch element disposed on the display panel.

As mentioned above, in the touch display panel, touch display device and display device of the invention, the touch panel is disposed over the display panel along the first direction, the optical film is disposed between the second substrate and the touch panel along the first direction, and the adhesive layer is disposed on the outside of the optical film and adheres to the second substrate and the touch panel. Or, the cover plate of the display device is disposed over the display panel along the first direction, the optical film is disposed between the second substrate and the cover plate along the first direction, and the adhesive layer is disposed on the outside of the optical film and adheres to the second substrate and the cover plate. Thereby, in comparison with the conventional art, the touch display panel, touch display device and display device of the invention can fit the requirements of lightness, thinness and mechanical strength.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

To be noted, all embodiments described below are exemplary illustrations but not for showing the actual dimensions.

Figure 1:
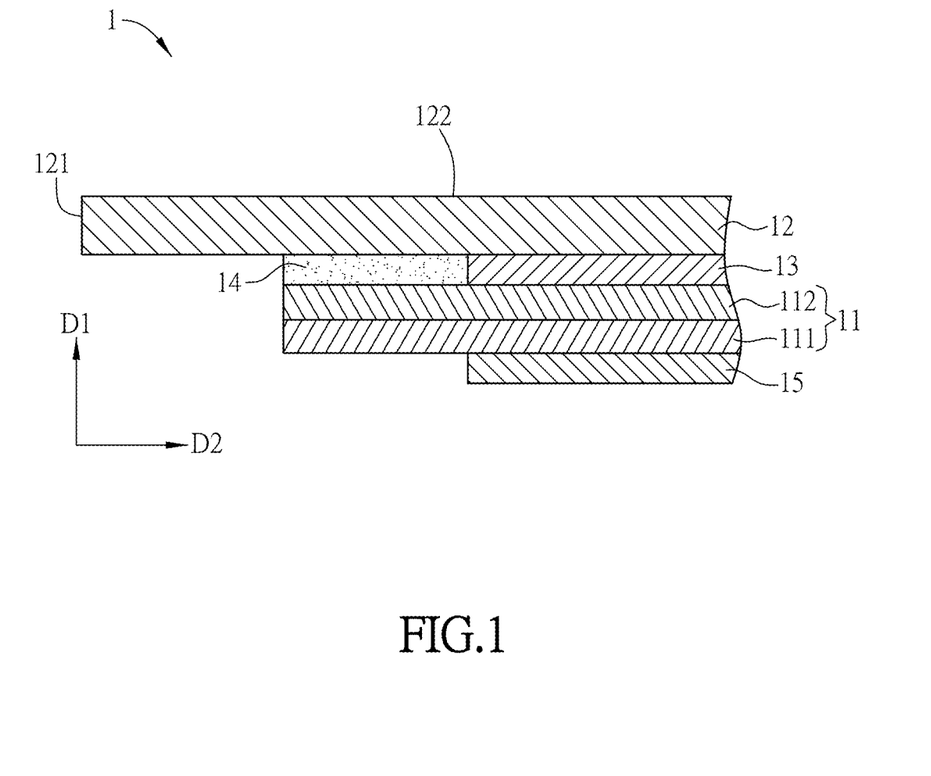
FIG. 1 is a schematic diagram of a touch display panel according to an embodiment of the invention.

FIG. 1 is a schematic diagram of a touch display panel 1 according to an embodiment of the invention. To be mentioned first, as shown in FIG. 1, the outside of a certain element illustrated in the following description denotes the side farther from the center of the touch display panel 1 along a second direction D2 while the inside is referred to the side closer to the center of a touch surface 122 of the touch display panel 1.

The touch display panel 1 includes a display panel 11, a touch panel 12, an optical film 13 and an adhesive layer 14.

The display panel 11 includes a first substrate 111 and a second substrate 112, and the first substrate 111 and the second substrate 112 are disposed oppositely along a first direction D1. Herein, the first direction D1 denotes the direction perpendicular to the touch surface of the touch panel 12 and to a second direction D2. In this embodiment, the area of the first substrate 111 is substantially equal to that of the second substrate 112, and the edges thereof are flush with each other.

The display panel 11 can be a liquid crystal display (LCD) panel, or an organic light emitting diode (OLED) display panel, and herein the display panel 11 is an LCD panel for example. The first substrate 111 and the second substrate 112 of the display panel 11 and the touch panel 12 are made by material permeable to light, and each can be a glass substrate, a quartz substrate or a plastic substrate for example.

In this embodiment, the first substrate 111 is a thin film transistor (TFT) substrate and the second substrate 112 is a color filter (CF) substrate for example. In other embodiments, the black matrix of the CF substrate can be removed to the TFT substrate so the first substrate 111 becomes a BOA (BM on array) substrate, or the CF layer is removed to the TFT substrate so the first substrate 111 becomes a COA (color filter on array) substrate. The above mentioned structures are just for example but not for limiting the scope of the invention. Besides, the display panel 11 can further include a liquid crystal layer (not shown), which is disposed between the first substrate 111 and the second substrate 112 along the first direction D1.

The touch panel 12 is disposed over the display panel 11 along the first direction D1. In this embodiment, an edge 121 of the touch panel 12 exceeds the corresponding edge of the second substrate 112. The interval between the edge 121 of the touch panel 12 and the corresponding edge of the first substrate 111 along the second direction D2 can be greater than or equal to 1 mm and less than or equal to 3 mm, and the interval between the edge 121 of the touch panel 12 and the corresponding edge of the second substrate 112 along the second direction D2 can be greater than or equal to 1 mm and less than or equal to 3 mm. Moreover, the interval between the edge 121 of the touch panel 12 and the corresponding edge of the optical film 13 along the second direction D2 can be greater than or equal to 2 mm and less than or equal to 5 mm. Herein for example, the interval between the edge 121 of the touch panel 12 and the corresponding edge of the optical film 13, first substrate 111 or second substrate 112 along the second direction D2 is all equal to 2 mm. The touch panel 12 can include a substrate and a touch electrode pattern (not shown), and the touch electrode pattern is disposed on the substrate. As an embodiment, the substrate is a cover glass and therefore the touch panel 12 becomes an OGS (one glass solution) type. However, in other embodiments, the touch electrode pattern can be disposed on the substrate and the substrate is attached to a cover glass.

The optical film 13 is disposed between the second substrate 112 and the touch panel 12 along the first direction D1. Herein for example, the optical film 13 is an upper polarizer disposed between the second substrate 112 and the touch panel 12. The thickness of the optical film 13 along the first direction D1 can be greater than or equal to 0.1 mm and less than or equal to 0.2 mm. Moreover, the interval between the optical film 13 and the touch panel 12 along the first direction D1 can be greater than or equal to 0 mm and less than or equal to 0.3 mm. Favorably, the optical film 13 directly contacts the touch panel 12 with the interval of 0 mm. Thereby, the touch display panel 1 is featured by lightness and thinness with a less deformation when being pressed, and the display panel 11 can support the touch panel 12 to a certain degree, so that the touch panel 12 can fit the requirement of mechanical strength without undergoing an additional mechanical strengthening process.

The touch display panel 1 of this embodiment can further include another optical film 15, which can be a lower polarizer and disposed on the side of the first substrate 111 away from the second substrate 112. However, if the display panel 11 is an OLED display panel in other embodiments, it includes a single optical film 13, and the optical film 13 is, for example but not limited to, a ¼λ circular polarizer, polarizing plate, anti-reflection film or their combination.

The adhesive layer 14 is disposed on the outside of the optical film 13 and directly contacts the second substrate 112 and the touch panel 12 along the first direction D1 to adhere to them. Herein, the adhesive layer 14 is disposed at the outer edge of the optical film 13 and between the second substrate 112 and the touch panel 12 and directly contacts the second substrate 112 and the touch panel 12. In the conventional art, an adhesive layer will be disposed between the touch panel and the optical film (upper polarizer) to fix the touch panel and the optical film, but this kind of structure will increase the whole thickness of the touch display panel and thus can't fit the requirements of lightness and thinness. Differently, as shown in FIG. 1, the adhesive layer 14 is disposed on the outside of the optical film 13 and directly contacts the substrate 112 and the touch panel 12 along the first direction D1, so the interval between the touch panel 12 and the optical film 13 is zero and the whole thickness of the touch display panel 1 is decreased to fit the requirements of lightness, thinness and mechanical strength.

The interval between the outer edge of the optical film 13 and the inner edge of the adhesive layer 14 along the second direction D2 can be greater than or equal to 0 mm and less than or equal to 0.1 mm (0 mm denotes that the outer edge of the optical film 13 contacts the inner edge of the adhesive layer 14). Herein for example, the interval between the outer edge of the optical film 13 and the inner edge of the adhesive layer 14 along the second direction D2 is 0 mm. Moreover, the thickness of the adhesive layer 14 along the first direction D1 is 1~1.5 times the thickness of the optical film 13. Herein for example, the thickness of the adhesive layer 14 along the first direction D1 is equal to that of the optical film 13. Besides, the width of the adhesive layer 14 along the second direction D2 can be greater than or equal to 0.7 mm and less than or equal to 0.9 mm.

Figure 6:
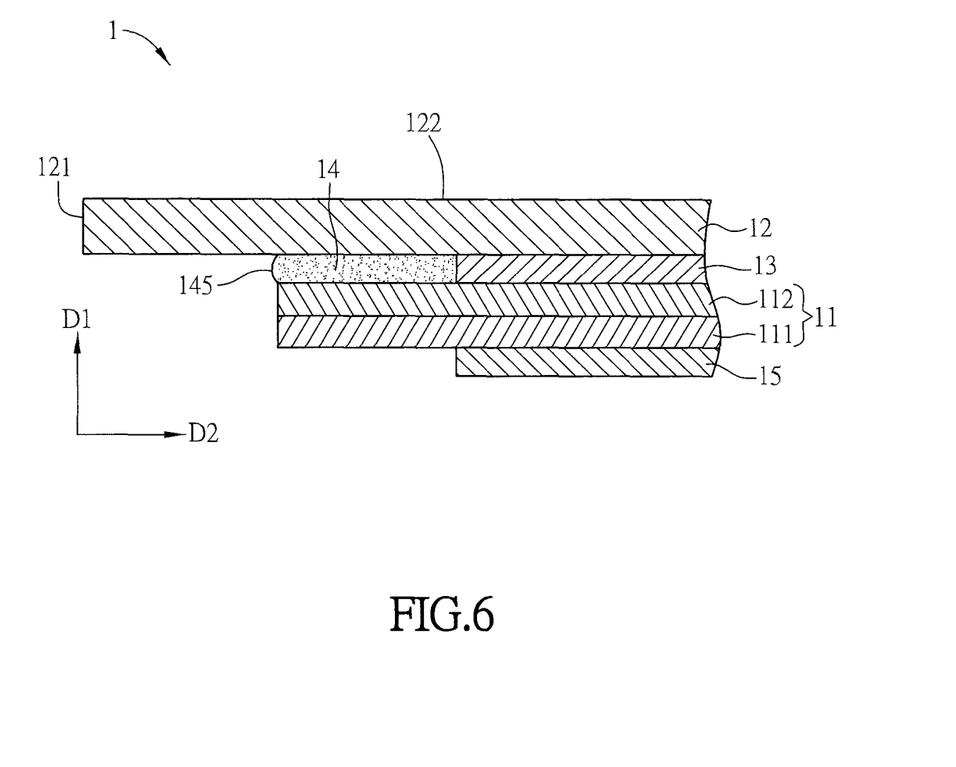
FIG. 6 is a schematic diagram of a display device according to an embodiment of the invention.

The adhesive layer 14 can be a black double-sided adhesive (such as a twin adhesive) with stickiness and flexibility and the adhesion thereof can be between 5N/cm~20N/cm. Moreover, the outer edge of the adhesive layer 14 and the outer edge of the second substrate 112 are on the same plane along the first direction D1. Physically, the outer edge of the adhesive layer 14 and the outer edge of the second substrate 112 are flush with each other along the first direction D1. As an embodiment, the adhesive layer 14 has flexibility, so when the adhesive layer 14 is compressed by the touch panel 12 and the display panel 11, the outer edge of the adhesive layer 14 will protrude from the second substrate 112 and the protruding portion thereof may have a curved shape 145 (as shown in FIG. 6).

Figure 2:
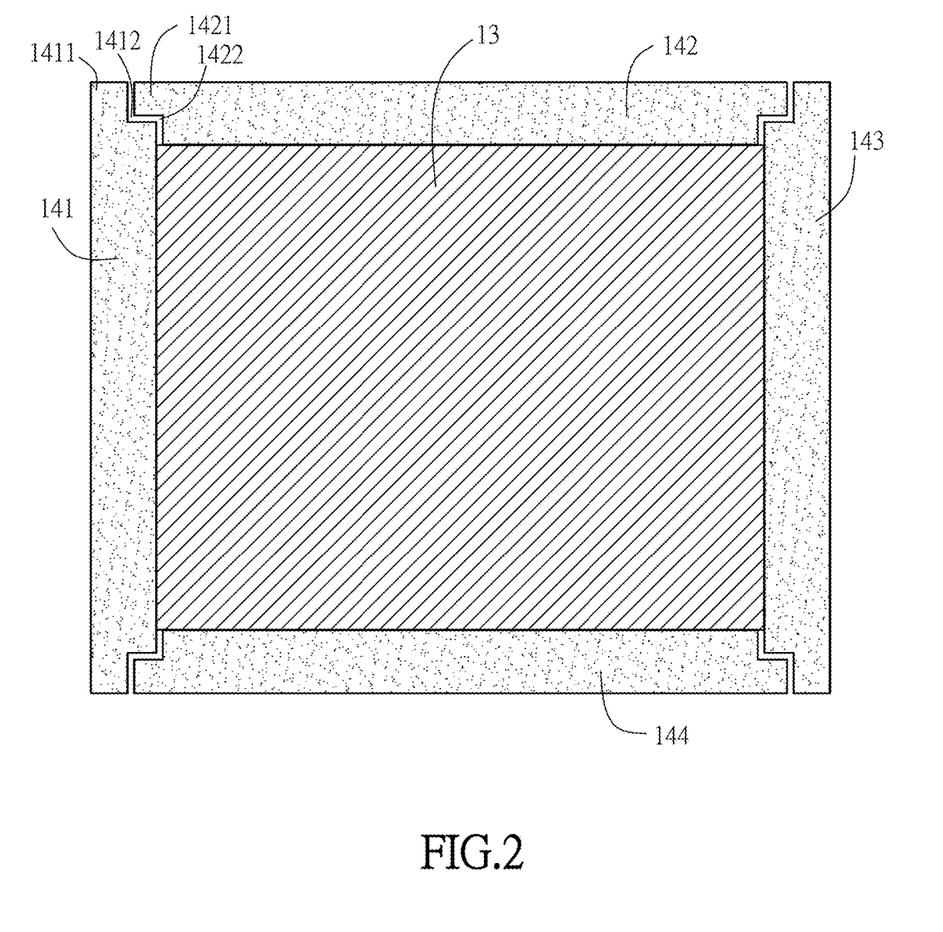
FIG. 2 is a schematic top view of the adhesive layer and the optical film of the touch display panel in FIG. 1.

FIG. 2 is a schematic top view of the adhesive layer 14 and the optical film 13 of the touch display panel 1 in FIG. 1. Herein, for clearly illustrating the adhesive layer 14 and the optical film 13, only the adhesive layer 14 and the optical film 13 are shown in FIG. 2 and the other elements of the touch display panel 1 are not shown.

In this embodiment, the adhesive layer 14 includes a plurality of adhesive elements, and herein there are four adhesive elements 141, 142, 143, 144 for example. The adhesive elements 141, 142, 143, 144 are disposed at the outer edges of the optical film 13 and directly contact the optical film 13. Each of the adhesive elements 141, 142, 143, 144 can be a dark colored double-sided adhesive (such as a black twin adhesive). The end of each of the adhesive elements 141, 142, 143, 144 can have a protrusion and an indentation, and the protrusion of one of the adhesive elements is complementary to the indentation of the adjacent adhesive element. In other words, the protrusion and the indentation of the two adjacent adhesive elements are disposed correspondingly. By taking the adhesive elements 141, 142 as an example, the end of the adhesive element 141 has a protrusion 1411 and an indentation 1412, and the end of the adhesive element 142 also has a protrusion 1421 and an indentation 1422, wherein the indentation 1412 of the adhesive element 141 and the protrusion 1421 of the adhesive element 142 are disposed correspondingly and form a complementary structure. The adhesive layer 14 is formed by the complementary structures of the adhesive elements 141, 142, 143, 144 so as to be disposed at the outer edges of the optical film 13 and directly contact the optical film 13.

Figure 3:
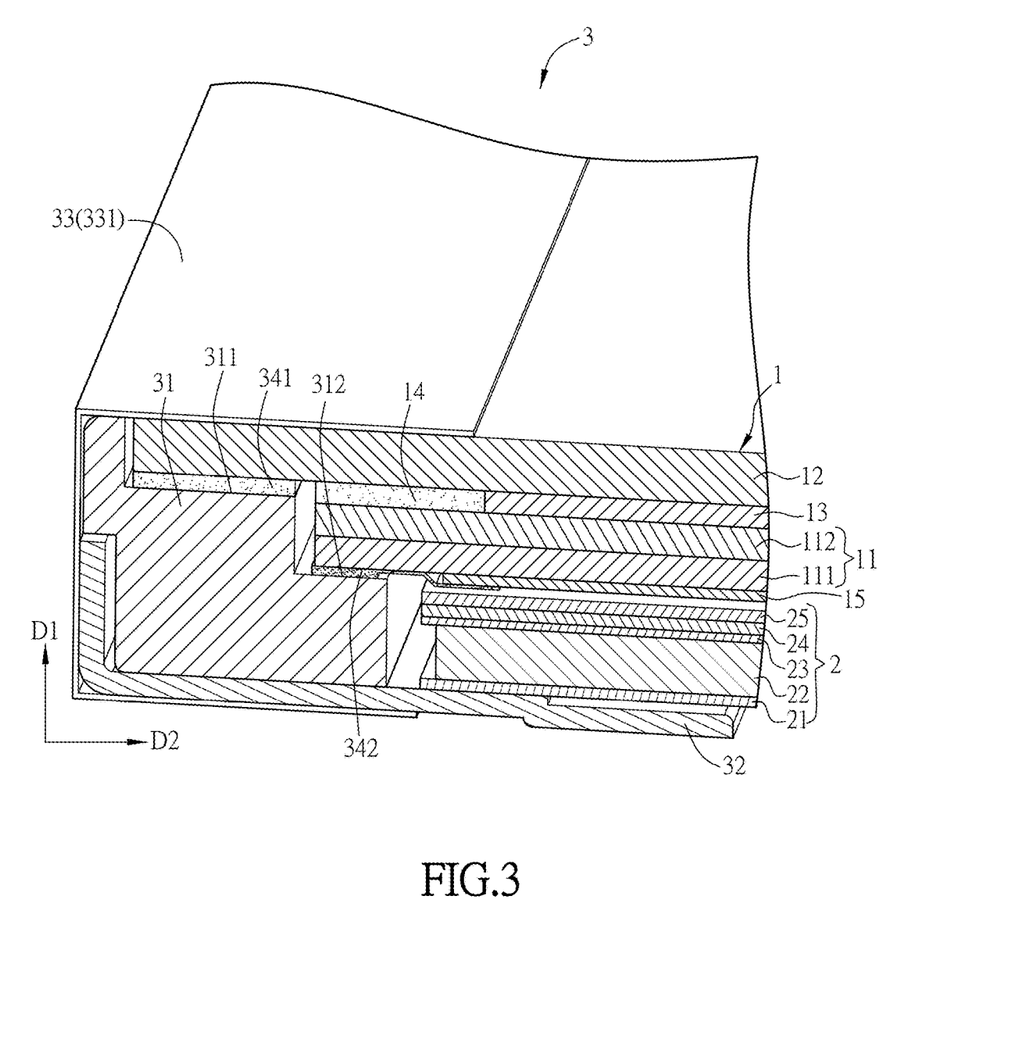
FIG. 3 is a schematic diagram of a touch display device according to an embodiment of the invention.

FIG. 3 is a schematic diagram of a touch display device 3 according to an embodiment of the invention.

As shown in FIG. 3, the touch display device 3 includes a touch display panel 1 and a backlight module 2. Since the touch display panel 1 has been illustrated as above, it is not described here for conciseness. The backlight module 2 is disposed on the side of the display panel 11 away from the touch panel 12 along the first direction D1. Herein, the backlight module 2 is disposed opposite to the display panel 11 and capable of emitting the light into the display panel 11 so that the display panel 11 can display images. In this embodiment, the backlight module 2 includes a reflective plate 21, a light guiding plate 22 and a plurality of optical films 23, 24, 25. The optical films 23, 24, 25 are, for example but not limited to, light concentrating sheets or diffusing sheets. Since the backlight module 2 can be provided by the conventional art, it can be comprehended by those skilled in the art and is therefore not described here for conciseness.

The touch display device 3 further includes a plastic frame 31 and a back plate 32. The plastic frame 31 is used to hold the display panel 11 and the touch panel 12 so that the display panel 11 can be disposed opposite to the backlight module 2 along the first direction D1 and the touch panel 12 can be disposed opposite to the display panel 11 along the first direction D1. The plastic frame 31 is disposed adjacent to the backlight module 2 and the touch display panel 1 is disposed on the plastic frame 31, so that the touch panel 12 is held by a holding surface 311 of the plastic frame 31 and the first substrate 111 and the second substrate 112 are held by another holding surface 312. Moreover, a buffer material 341 is disposed on the holding surface 311 of the plastic frame 31 to provide the buffer between the touch panel 12 and the plastic frame 31, and another buffer material 342 is disposed on the holding surface 312 of the plastic frame 31 to provide the buffer between the first substrate 111 and the plastic frame 31. Herein, the plastic frame 31 is accommodated to the shape of the touch panel 12 so as to limit the lateral movement of the touch panel 12 and the display panel 11. Besides, the back plate 32 is used to accommodate the display panel 1, the backlight module 2 and the plastic frame 31, and can provide the protection against collision, electromagnetic wave or electric shock. Herein, the back plate 32 can be made by plastic, metal or alloy material for example.

The touch display device 3 can further include a front frame 33, which is a light-blocking tape for example and is disposed at the outer edge of the touch panel 12. The front frame 33 also includes a blocking portion 331 disposed on the touch panel 12 to block the scattered light and provide a fixing effect. Herein, the front frame 33 is disposed to the back plate 32 by adhering and covers a part of the touch panel 12, the plastic frame 31, a side surface of the back plate 32 and a part of the bottom surface.

Figure 4:
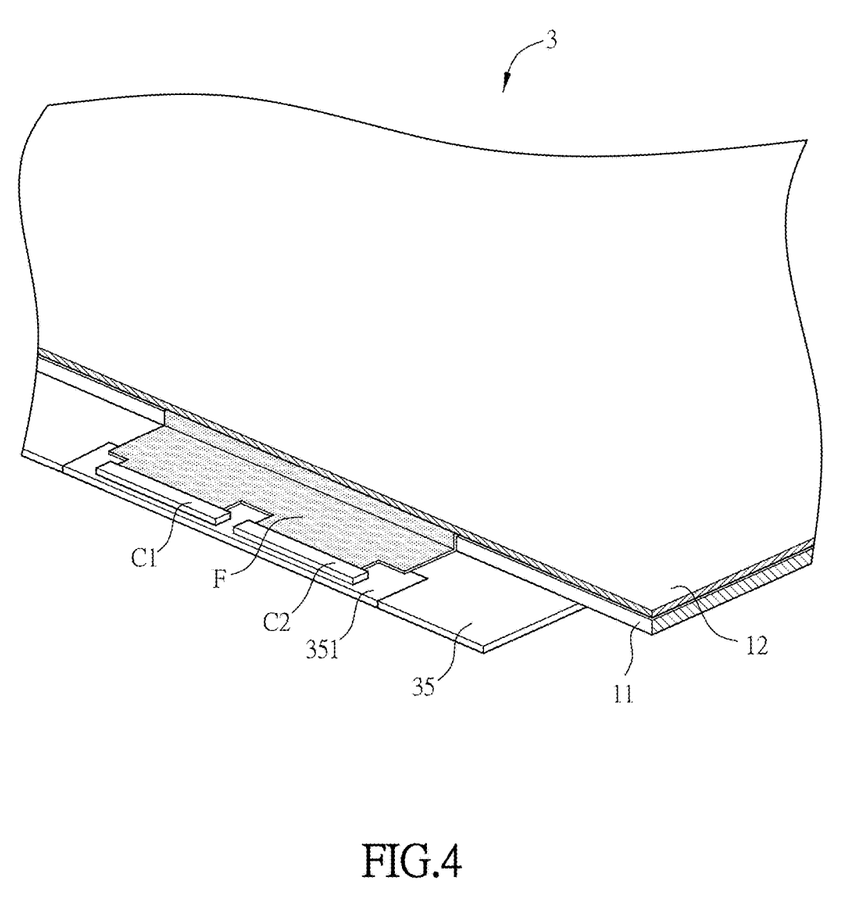
FIG. 4 is another schematic diagram of the touch display device according to an embodiment of the invention.

FIG. 4 is another schematic diagram of the touch display device 3 according to an embodiment of the invention, just showing a part of the elements of the touch display device 3.

As shown in FIG. 4, the touch display device 3 can further include a control circuit board 35, which is electrically connected to the display panel 11 and the touch panel 12. Herein, the touch panel 12 and the display panel 11 share the same control circuit board 35. In this embodiment, the control circuit board 35 includes a driving circuit board 351 for driving the touch panel 12, in addition to the driving control circuit of the display panel 11 (such as a scan driving circuit, data driving circuit or timing control circuit). The driving circuit board 351 is electrically connected to the lower surface of the touch panel 12 through a circuit connecting board F and two connecting terminals C1, C2 to drive and control the operation of the touch panel 12. The circuit connecting board F is, for example but not limited to, a flexible print circuit (FPC) board or a rigid-flex board. Moreover, the driving circuit board 351 is embedded into a recess of the control circuit board 35 or can be screwed into the recess of the control circuit board 35, so that the circuit for driving the display panel 11 and the touch panel 12 are integrated to the same control circuit board 35.

Figure 5:
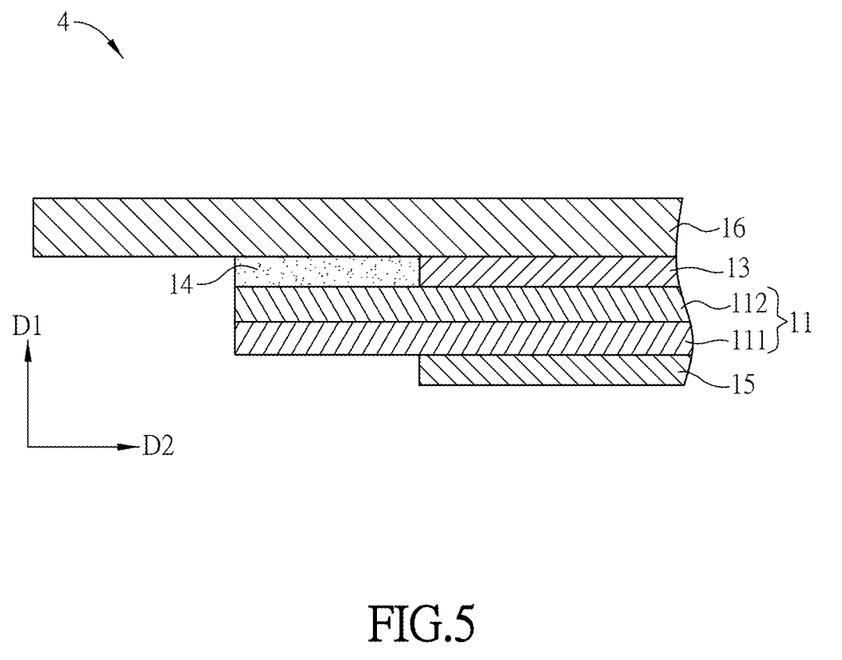
FIG. 5 is a schematic diagram of a display device according to an embodiment of the invention.

FIG. 5 is a schematic diagram of a display device 4 according to an embodiment of the invention.

As shown in FIG. 5, the display device 4 includes a display panel 11, a cover plate 16, an optical film 13 and an adhesive layer 14. Since the technical features of the display panel 11 including the first substrate 111 and the second substrate 112 are clearly illustrated in the above embodiments, they are not described here for conciseness.

The cover plate 16 is, for example but not limited to, a transparent glass substrate or plastic substrate, and the optical film 13 is disposed between the second substrate 112 and the cover plate 16 along the first direction D1. Herein, the relations of the optical film 13 with the second substrate 112, the cover plate 16 and the adhesive layer 15 can be comprehended by referring the relations of the optical film 13 of the touch display panel 1 with the second substrate 112, the touch panel 12 and the adhesive layer 14 as mentioned above, so they are not described here for conciseness.

The adhesive layer 14 is disposed on the outside of the optical film 13 and directly contacts the second substrate 112 and the cover plate 16 along the first direction D1 to adhere to them. Herein, since the technical features of the adhesive layer 14 have been illustrated as above, they are not described here for conciseness.

As an embodiment, the display device 4 can further include a touch element (not shown), so that the display device 4 becomes an in-cell touch display device. The touch element is a touch electrode layer for example and is disposed on the display panel 11. For example, the touch element can be disposed on the first substrate 111 or the second substrate 112.

Summarily, in the touch display panel, touch display device and display device of the invention, the touch panel is disposed over the display panel along the first direction, the optical film is disposed between the second substrate and the touch panel along the first direction, and the adhesive layer is disposed on the outside of the optical film and adheres to the second substrate and the touch panel. Or, the cover plate of the display device is disposed over the display panel along the first direction, the optical film is disposed between the second substrate and the cover plate along the first direction, and the adhesive layer is disposed on the outside of the optical film and adheres to the second substrate and the cover plate. Thereby, in comparison with the conventional art, the touch display panel, touch display device and display device of the invention can fit the requirements of lightness, thinness and mechanical strength.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch display panel, comprising:
a display panel including a first substrate and a second substrate disposed opposite to the first substrate along a first direction;
a touch panel disposed over the display panel along the first direction;
an optical film disposed between the second substrate and the touch panel along the first direction, the optical film contacting the touch panel; and
an adhesive layer disposed adjacent to the optical film, the adhesive layer contacting the second substrate and the touch panel.

2. The touch display panel as recited in claim 1, wherein the optical film is a polarizer.

3. The touch display panel as recited in claim 1, wherein a thickness of the optical film along the first direction is greater than or equal to 0.1 mm and less than or equal to 0.2 mm.

4. The touch display panel as recited in claim 1, wherein a thickness of the adhesive layer along the first direction is 1~1.5 times a thickness of the optical film.

5. The touch display panel as recited in claim 1, wherein an outer edge of the adhesive layer and an outer edge of the second substrate are on the same plane along the first direction.

6. The touch display panel as recited in claim 1, wherein a width of the adhesive layer along a second direction is greater than or equal to 0.7 mm and less than or equal to 0.9 mm, and the second direction is perpendicular to the first direction.

7. The touch display panel as recited in claim 6, wherein a distance between an outer edge of the optical film and an inner edge of the adhesive layer along the second direction is greater than or equal to 0 mm and less than or equal to 0.1 mm.

8. The touch display panel as recited in claim 6, wherein a distance between an outer edge of the touch panel and an outer edge of the first substrate along the second direction is greater than or equal to 1 mm and less than or equal to 3 mm.

9. The touch display panel as recited in claim 6, wherein a distance between an outer edge of the touch panel and an outer edge of the second substrate along the second direction is greater than or equal to 1 mm and less than or equal to 3 mm.

10. The touch display panel as recited in claim 6, wherein a distance between an outer edge of the touch panel and an outer edge of the optical film along the second direction is greater than or equal to 2 mm and less than or equal to 5 mm.

11. The touch display panel as recited in claim 1, wherein an adhesion of the adhesive layer is between 5 N/cm~20 N/cm.

12. The touch display panel as recited in claim 1, wherein an outer edge of the adhesive layer has a curved shape.

13. The touch display panel as recited in claim 1, wherein the adhesive layer includes a plurality of adhesive elements, an end of each of the adhesive elements has a protrusion and an indentation, and the protrusion of one of the adhesive elements is complementary to the indentation of the adjacent adhesive element.

14. The touch display panel as recited in claim 13, wherein each of the adhesive elements is a black double-sided adhesive.

15. The touch display panel as recited in claim 1, wherein the touch panel includes a substrate which is a cover plate.

16. A touch display device, comprising:
   a touch display panel comprising:
   a display panel including a first substrate and a second substrate disposed opposite to the first substrate along a first direction;
   a touch panel disposed over the display panel along the first direction;
   an optical film disposed between the second substrate and the touch panel along the first direction, the optical film contacting the touch panel; and
   an adhesive layer disposed adjacent to the optical film, the adhesive layer contacting the second substrate and the touch panel; and
   a backlight module disposed on the side of the display panel away from the touch panel along the first direction.

17. The touch display device as recited in claim 16, further comprising:
   a control circuit board electrically connected to the display panel and the touch panel.

18. A display device, comprising:
   a display panel including a first substrate and a second substrate disposed opposite to the first substrate along a first direction;
   a cover plate disposed over the display panel along the first direction;
   an optical film disposed between the second substrate and the cover plate along the first direction, the optical film contacting the cover plate; and
   an adhesive layer disposed adjacent to the optical film, the adhesive layer contacting the second substrate and the cover plate.

19. The display device as recited in claim 18, further comprising:
   a touch element disposed on the display panel.

* * * * *